United States Patent

Otani et al.

[11] 4,097,813
[45] Jun. 27, 1978

[54] CARRIER WAVE RECOVERY CIRCUIT

[75] Inventors: Susumu Otani; Toshitake Noguchi, both of Tokyo, Japan

[73] Assignee: Nippon Electric Co., Ltd., Tokyo, Japan

[21] Appl. No.: 803,900

[22] Filed: Jun. 6, 1977

[30] Foreign Application Priority Data

Jun. 8, 1976  Japan .................. 51-67329

[51] Int. Cl.² ............................................ H03K 9/00
[52] U.S. Cl. .................................. 329/104; 329/110; 329/124
[58] Field of Search ............... 329/104, 112, 124, 110; 331/12

[56] References Cited

U.S. PATENT DOCUMENTS 3,638,125  1/1972  Goell .................................. 329/124

Primary Examiner—John Kominski
Attorney, Agent, or Firm—Ostrolenk, Faber, Gerb & Soffen

[57] ABSTRACT

A circuit for extracting a carrier wave signal from a double binary PSK signal input is disclosed. The PSK input signal is applied to a first frequency doubler which doubles the frequency of the input signal. The output of the first frequency doubler is applied to a second frequency doubler and to first and second band-pass filter circuits. The second frequency doubler serves to quadruple the frequency of the PSk input signal and derives a signal having a line spectrum at the frequency 4fc whenever there is no phase shift between successive time slots of the PSK signal. The first and second band-pass filters derive first and second signals having line spectra at frequencies 2fc + fs and 2fc − fs, respectively, whenever there is a phase shift of +90° or −90°, respectively, between successive time slots of the PSK input signal. The outputs of the band-pass filter circuits are combined in first and second frequency mixers with a clock frequency signal which is synchronized with the clock frequency component of the input signal. The outputs of the frequency mixers are combined in a first signal combiner circuit whose output is applied to third frequency doubler. The output of the third frequency doubler has a line spectrum at 4fc whenever there is a ± 90° phase shift between successive time slots of the PSK input signal. The outputs of the first and third frequency doublers are combined in a second signal combiner and applied to a carrier wave synchronizing circuit which derives the desired synchronized carrier wave.

2 Claims, 1 Drawing Figure

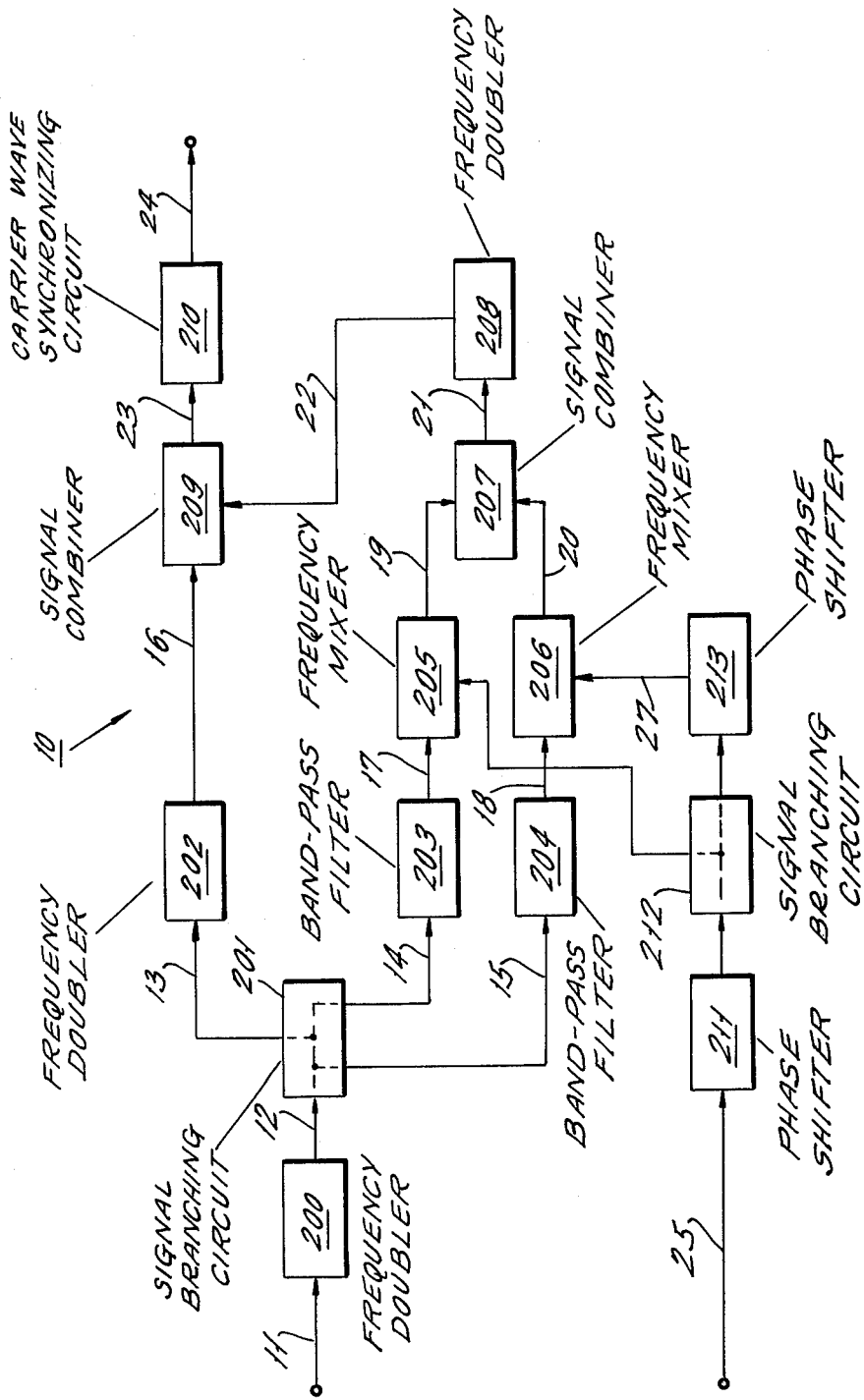

CARRIER WAVE RECOVERY CIRCUIT

BACKGROUND OF THE INVENTION

The present invention relates to a carrier wave recovery circuit, and more particularly, to a carrier wave recovery circuit in a double-binary phase-modulation system.

An article by Robert K. Kwan entitled "The Effects of Filtering and Limiting a Double-Binary PSK Signal", IEEE *Transactions On Aerospace And Electronics Systems,* July 1969, Vol. AES-5, No. 4, pp 589 – 594, describes a double-binary phase-modulation system which is resistant to degradation effects caused by a non-linear transmission path. According to this double-binary modulation system, an input message comprising a plurality of binary bits is divided into two separate signals each 180° out of phase with the other. One signal is derived from the odd bits of the input message while the remaining signal is derived from the even bits thereof. Thereafter, each of the derived signals is modulated by a carrier waveform and combined to produce a double-binary phase-modulated signal.

When demodulating the waveform formed in the foregoing double-binary phase-modulated system, it is preferable to utilize a synchronous detection technique. To this end, a stable carrier wave must be reproduced at the receiver.

Several prior art carrier wave recovery circuits have been proposed. In one such circuit, the receiver signal is applied to a fourfold frequency multiplier and thereafter to a carrier wave synchronizing circuit. The synchronizing circuit may consist of a narrow-band filter and a ¼ frequency divider. While this recover circuit is suitable for many applications, it is impractical in those instances wherein the incoming modulated waveform is subjected to band suppression by the transmission path. In such applications, the output of the fourfold frequency multiplier contains a line (or discrete) spectrum at a frequency 4fc (fc representing the carrier wave frequency) and a continuous spectrum component with respect to frequency only when the incoming modulated wave has no phase shift in successive time slots. Since the carrier wave synchronizing circuit utilizes the 4fc line spectrum to derive the carrier wave frequency fc, the carrier wave cannot be recovered whenever there is a phase shift in successive time slots. Accordingly, a stable synchronizing recovery carrier wave cannot always be obtain.

A second prior art carrier wave recovery circuit is described in an article by T. Noguchi and S. Otani entitled "Multilevel PSK Modems For TDMA System", *Eascon '75 Record (IEEE Electronics and Aerospace Systems Convention),* pp. 139A – 139F, especially FIGS. 2.3.2, Sept. 29– Oct. 1, 1975. The recovery circuit described therein is specifically adapted for an N-phase digital phase-modulated wave which has been subject to band suppression by the transmission path. This circuit has been designed to eliminate the aforementioned disadvantages of the above described carrier wave recovery circuit. In the Noguchi and Otani recovery circuit, an N-phase digital phase-modulated wave is applied to the input of an N-fold frequency multiplier circuit which generates a signal having a line spectrum at a frequency Nfc if the incoming N-phase digital phase-modulated wave has no phase shift between successive time slots and a signal have a line spectrum at Nfc ± fs (fs representing the clock frequency) if there is a phase shift of ± 2 π/N between successive time slots. The signal having the line spectrum at Nfc is applied directly to a signal combiner circuit. The signals having the line spectrum at Nfc ± fs are, after having been derived by band-pass filters having their center frequencies at Nfc ± fs, respectively, mixed with a separately derived clock signal having the frequency fs in frequency mixers so that both signals are converted to a signal having a line spectrum at Nfc. The converted signals are then applied to a signal combiner circuit. In this way, the carrier waveform is reproduced at the output of the signal combiner circuit both when a phase shift occurs between successive time slots and when there is no phase shift between successive time slots.

While the foregoing circuit provides a continuous recovered carrier waveform, it has certain disadvantages when utilized in a double-binary phase-modulation system. Particularly, if a double-binary phase-modulated wave is applied to the Noguchi and Otani wave recovery circuit, a signal having a line spectrum at 4fc (N = 4 in the double-binary system) appears at the output of the fourfold frequency multiplier when there is no phase shift between successive time slots of the input signal and a signal having a line spectrum at 4fc ± 2fs appears at the output of the frequency multiplier when a phase shift is present between successive time slots of the input signal. Thus, to accommodate a double binary phase modulated waveform, the fourfold frequency multiplier of the recovery circuit proposed by Noguchi and Otani must have a wide band characteristic covering the band width extending from 4fc – 2fs to 4fc + 2fs. Additionally, a frequency twice as high as the clock frequency is required for converting the frequencies 4fc ± 2fs into a signal having a line frequency at 4fc.

The present invention is designed to overcome the foregoing disadvantages in the prior art carrier wave recovery circuits while at the same time providing a continuous recovered carrier wave output.

SUMMARY OF THE INVENTION

In accordance with the present invention, a first frequency doubler receives the double-binary phase-modulated carrier wave and generates an output signal having line spectra at frequencies 2fc + fs and 2fc – fs, wherein fc is the frequency of the carrier wave to be extracted and fs is the frequency of the clock component of the modulated carrier wave. The output of the first frequency doubler is applied to a second frequency doubler and to first and second band-pass filters. The first and second band-pass filters have center frequencies at 2fc + fs and 2fc – fs, respectively.

The output of the first and second band-pass filters are applied to first and second frequency mixers, respectively, and are mixed therein with a locally derived clock signal having a frequency fs and being in-phase with the clock component of the double-binary phase-modulated carrier wave. The first and second frequency mixers are each adapted to mix the output of the first and second band-pass filters, respectively, with the locally derived clock signal in such a manner as to generate output signals having a line spectrum at the frequency 2fc.

The outputs of the first and second mixers are applied to a combiner circuit whose output is applied to a third frequency doubler. The output of the third frequency doubler has a line spectrum at the frequency 4fc and is combined with the output of second frequency doubler in a second combiner circuit. Finally, the output of the second combiner circuit is applied to a carrier wave synchronizing circuit which derives the synchronized carrier waveform.

BRIEF DESCRIPTION OF THE DRAWINGS

The drawing illustrates a carrier wave recovery circuit constructed in accordance with the principles of the present invention.

DETAILED DESCRIPTION OF THE PREFERRED EMBODIMENT

Referring now to the drawing, a double-binary phase-modulated carrier wave including a clock frequency component, is applied to input terminal 11 of carrier wave recovery circuit 10. Input terminal 11 is connected to a frequency doubler 200 which derives a modulated wave 12 whose frequency has been doubled. In accordance with standard communications theory, the signal 12 will have line spectra at frequencies 2fc + fs and 2fc − fs, wherein fc is the frequency of the carrier wave to be recovered and fs is the frequency of the clock component of the modulated carrier wave applied to input terminal 11. It should be noted that the signal 12 does not have a line spectrum at the frequency 2fc.

The signal 12 is applied via a signal branching circuit 201 to the inputs of frequency doubler 202 and band-pass filters 203 and 204 via lines 13,14 and 15. Frequency doubler 202 doubles the frequency of the modulated wave 12 and derives a modulated waveform 16 whose output has a line spectrum at the frequency 4fc whenever there is no phase shift between successive time slots of the double-binary phase-modulated waveform applied to input 11.

The band-pass filters 203 and 204 have a center-line frequency of 2fc + fs and 2fc − fs, respectively, and pass a signal 17 having a line spectrum at the frequency 2fc + fs and a signal 18 having a line spectrum at the frequency 2fc − fs, respectively. Signals 17 and 18 are frequency mixed in frequency mixers 205 and 206, respectively, with a locally generated clock signal. The locally generated clock signal has a frequency fs and is in-phase with the clock frequency component of the double-binary phase modulated carrier wave applied to input terminal 11. An appropriate circuit for obtaining the locally generated clock signal is disclosed in an article by Floyd M. Gardmen entitled "Phase Lock Techniques", published in 1966 by John Whiley and Sons, pp. 117–119, especially FIG. 8-10. The locally generated clock signal is applied to frequency mixer 205 via phase shifter 211, branching circuit 212 and line 26. The locally generated clock signal is applied to mixer circuit 206 via phase shifter 211, signal branching circuit 212, phase shifter 213 and line 27. It should be noted that the phase-shifters 211 and 213 are provided for the purpose of bringing the phases of the signal derived under a zero degree phase shift condition, the signal derived under a 90° phase shift condition and the signal derived under a −90° phase shift condition into coincidence.

Mixer circuit 205 combines the output of band-pass filter 203 and phase shifter 211 in such a manner as to generate a signal 19 having a line spectrum at the frequency 2fc whenever the phase of the double-binary phase-modulated waveform applied to input 211 gradually changes by +90° during one-half of a time slot. Mixer circuit 206 combines the output of band-pass filter 204 with the output of phase shifter 213 to generate a signal 20 having a line spectrum at the frequency 2fc whenever the phase of the double-binary phase-modulated carrier wave applied to input terminal 11 changes gradually by −90° during one-half time slot.

The signals 19 and 20 are applied to a signal combiner 207 (which may be a resistor hybrid) to form an output signal 21 having a line spectrum at the frequency 2fc whenever there is a phase shift of ±90° between successive time slots of the double-binary phase-modulated signal applied to input terminal. The signal 21 is applied to a third frequency doubler 208 which derives an output signal having a line spectrum at the frequency 4fc whenever a phase shift exists in the waveform applied to input terminal 11. This signal 22 is combined with the signal 16 in a second signal combiner 209 which yields an output signal 23 having a line spectrum at the frequency 4fc both when there is no phase shift between successive time slots of the input modulated waveform applied to input terminal 11 and when there is a phase shift of ±90° between successive time slots of the input signal.

Finally, the signal 23 is applied to a carrier wave synchronizing circuit 210 which may consist of a narrow band filter and a ¼ frequency divider. Alternatively, a phase synchronizing loop circuit may be used as the carrier wave synchronizing circuit 210. The output of carrier wave synchronizing circuit 210 is the desired recovered carrier wave.

As will be obvious from the above description, the signal 16 is identical to the output signal of the fourfold frequency multiplier in the first prior art carrier wave recovery circuit described above so that the signal having a frequency of 4fc appear only when the input modulated waveform exhibits no phase shift. On the other hand, the signals 17 and 18 are the signal components which appear when the phase of the input modulated waveform changes gradually by +90° and −90°, respectively, during one-half of a time slot and the output of the signal combiner circuit 207 is a signal having a frequency 2fc when either of the above phase changes occur. By providing the combination of elements disclosed above, applicant's carrier wave recovery circuit 10 provides a continuous carrier wave output for a double-binary phase-modulation system without the drawbacks of the prior art circuits noted above.

The present invention may be embodied in other specific forms without departing from the spirit or essential attributes thereof and, accordingly, reference should be made to the appended claims, rather than to the foregoing specification as indicating the scope of the invention.

What is claimed is:

1. A circuit for extracting a carrier wave from a double-binary PSK signal input which includes a clock frequency component, said circuit comprising:
   a first frequency doubler for doubling the frequency of said PSK signal input;
   a second frequency doubler connected to the output of said first frequency doubler for quadrupling the frequency of said PSK signal input;
   a first band-pass filter for deriving from the output of said first frequency doubler a signal having a line spectrum at the frequency 2fc + fs, wherein fc is the frequency of said carrier wave to be recovered and fs is the frequency of said clock frequency component;

a second band-pass filter for deriving from the output of said first frequency doubler a signal having a line spectrum at the frequency 2fc − fs;

a first frequency mixer means for mixing the output of said first band-pass filter with a clock frequency signal having the same frequency as and being in-phase with said clock frequency component, said first mixer means to mix said output of said first band-pass filter and said clock frequency signal in such a manner as to generate an output signal containing a line spectrum at the frequency 2fc;

a second frequency mixer means for mixing the output of said second band-pass filter with said clock frequency signal, said second mixer means to mix the output of said second band-pass filter and said clock frequency signal in such a manner as to generate an output signal containing a line spectrum at the frequency 2fc;

a first signal combiner circuit for combining the outputs of said first and second frequency mixer means;

a third frequency doubler connected to the output of said first signal combiner;

a second signal combiner for combining the outputs of said second and third frequency doublers;

a carrier wave synchronizing circuit for deriving a synchronized carrier wave from said output signal of said second signal combiner circuit.

2. The carrier wave recovery circuit of claim 1 wherein said clock frequency signal is locally derived from said modulated carrier wave and is synchronized with the modulation rate of said modulated carrier wave.

* * * * *